United States Patent
Takahashi

(10) Patent No.: US 12,393,382 B2
(45) Date of Patent: Aug. 19, 2025

(54) INFORMATION PROCESSING APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Kentaro Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 18/458,646

(22) Filed: Aug. 30, 2023

(65) Prior Publication Data

US 2024/0086128 A1 Mar. 14, 2024

(30) Foreign Application Priority Data

Sep. 9, 2022 (JP) .................... 2022-143936

(51) Int. Cl.
*G06F 3/12* (2006.01)

(52) U.S. Cl.
CPC .......... *G06F 3/1262* (2013.01); *G06F 3/1204* (2013.01); *G06F 3/1207* (2013.01); *G06F 3/1254* (2013.01)

(58) Field of Classification Search
None
See application file for complete search history.

(56) References Cited

U.S. PATENT DOCUMENTS

| | | | |
|---|---|---|---|
| 10,101,950 B2 * | 10/2018 | Kikuchi | G06F 3/1263 |
| 2009/0043628 A1 * | 2/2009 | Gombert | G06Q 10/06312 |
| | | | 705/7.22 |
| 2010/0257446 A1 * | 10/2010 | Woolfe | G06F 3/1256 |
| | | | 715/274 |
| 2012/0212771 A1 * | 8/2012 | Goddard | G06F 3/1255 |
| | | | 358/1.15 |
| 2018/0136889 A1 * | 5/2018 | Ward | G06F 3/1256 |
| 2019/0250864 A1 * | 8/2019 | Sugai | G06F 3/1288 |
| 2020/0081674 A1 * | 3/2020 | Fukami | G06F 3/1205 |
| 2020/0097221 A1 * | 3/2020 | Matsumoto | G06F 3/1204 |
| 2020/0099642 A1 * | 3/2020 | Mishima | H04L 51/52 |
| 2020/0099799 A1 * | 3/2020 | Obayashi | H04L 51/02 |
| 2020/0142654 A1 * | 5/2020 | Imai | G06F 3/1258 |
| 2020/0210125 A1 * | 7/2020 | Hakamata | G06F 3/1224 |
| 2020/0272387 A1 * | 8/2020 | Kawanishi | G06F 3/1267 |
| 2021/0103416 A1 * | 4/2021 | Arakawa | G03G 15/5083 |
| 2021/0132886 A1 * | 5/2021 | Inoue | G06F 3/1207 |
| 2021/0232349 A1 * | 7/2021 | Bermundo | G06F 3/1289 |
| 2022/0206726 A1 * | 6/2022 | Dohmae | G06F 3/1236 |
| 2024/0143244 A1 * | 5/2024 | Mitsui | G06F 3/1205 |
| 2024/0361964 A1 * | 10/2024 | Kim | G06F 3/1256 |

FOREIGN PATENT DOCUMENTS

JP 2020047000 A 3/2020

* cited by examiner

*Primary Examiner* — Helen Zong
(74) *Attorney, Agent, or Firm* — ROSSI, KIMMS & McDOWELL LLP

(57) ABSTRACT

An information processing apparatus includes: a specifying unit configured to specify, of messages received by a message exchange service between users, a message to which a job ticket for executing a job is attached; an acquisition unit configured to acquire information of the job ticket attached to the message specified by the specifying unit; and a display control unit configured to display, in the message exchange service, a list of information of the job ticket acquired by the acquisition unit.

12 Claims, 11 Drawing Sheets

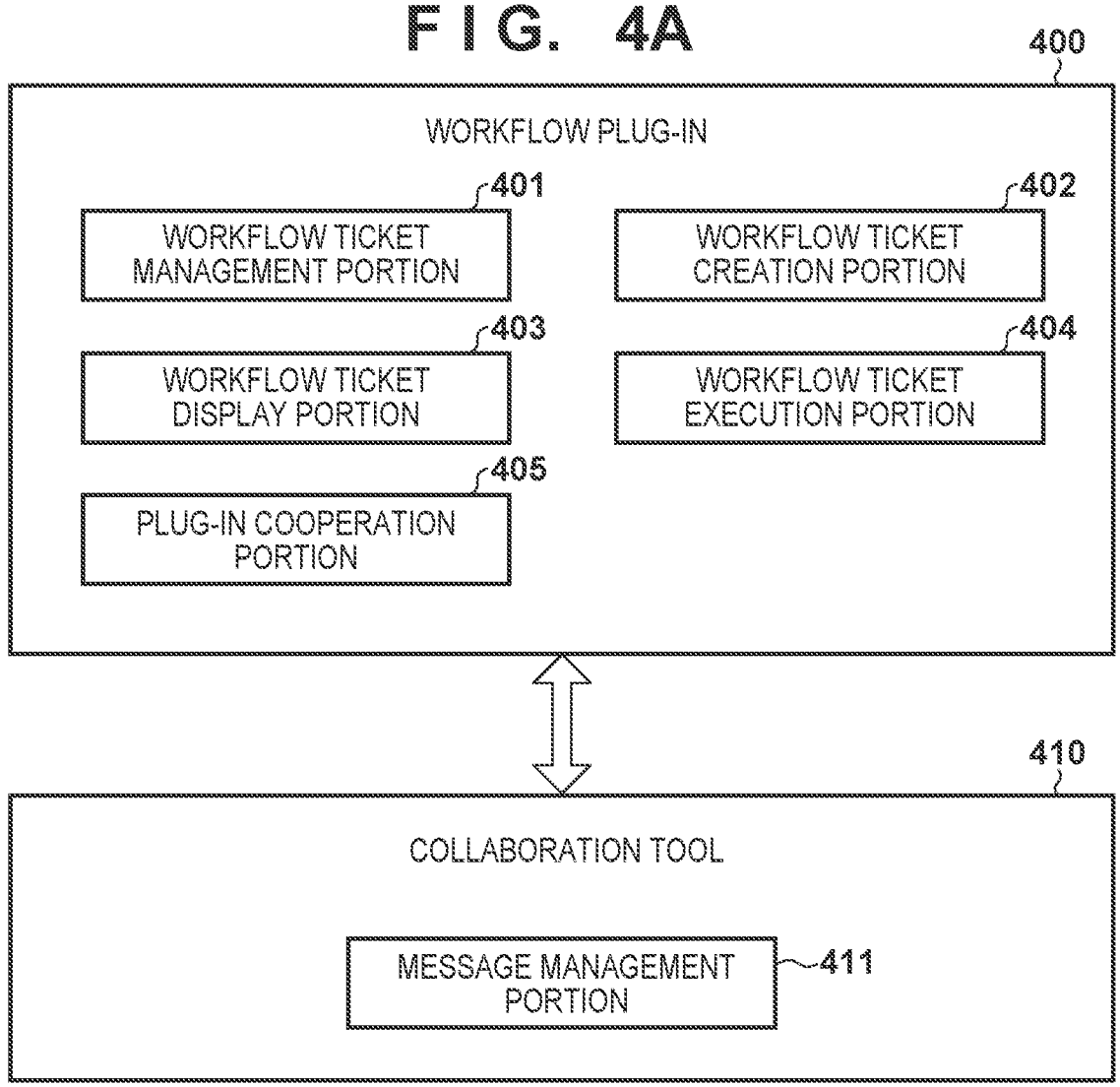
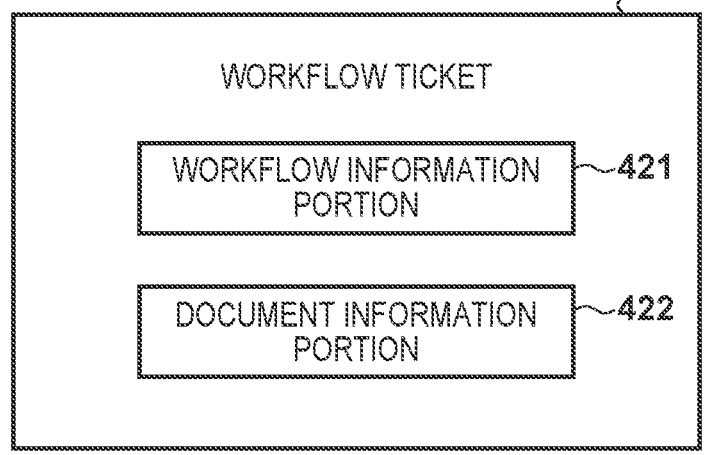

FIG. 9

| TASK NAME | DOCUMENT NAME | REQUESTER | PERSON IN CHARGE | REQUEST DATE | ▽ | |
|---|---|---|---|---|---|---|
| SAVE BINDER AFTER STAMPING | Yamada_DAILY REPORT_20220526.pdf | Yamada | Ookawa | 5/26 | | PRINT |
| SAVE BINDER AFTER STAMPING | DAILY REPORT_0526.pdf | Suzuki | Ookawa | 5/26 | | PRINT |
| SAVE BINDER AFTER STAMPING | Yamada_DAILY REPORT_20220527.pdf | Yamada | Ookawa | 5/27 | | PRINT |
| SIGN, SCAN, AND TRANSMIT TO ACCOUNTING | EXPENSES APPLICATION.docx | Yamada | PEOPLE WHO CAME TO WORK | 5/27 | | COMPLETE |

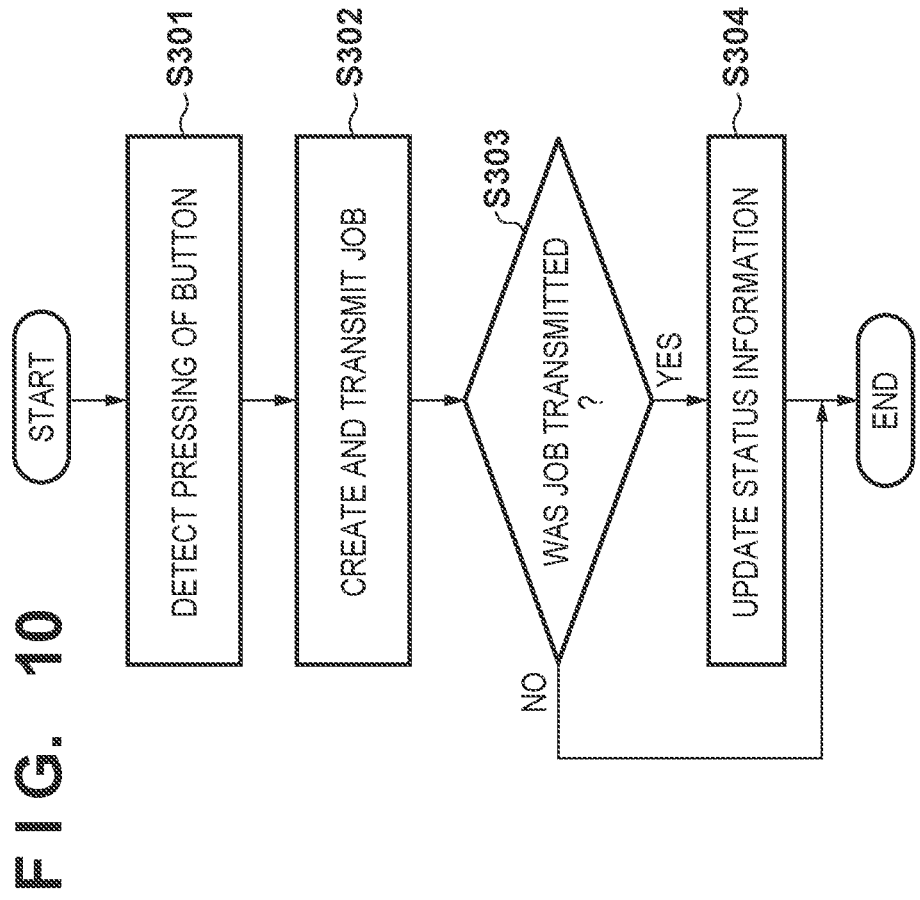

FIG. 13

| TASK NAME | DOCUMENT NAME | REQUESTER | PERSON IN CHARGE | REQUEST DATE ☑ | |
|---|---|---|---|---|---|
| SAVE BINDER AFTER STAMPING | Yamada_DAILY REPORT _20220526.pdf | Yamada | Ookawa | 5/26 | PRINT |
| SAVE BINDER AFTER STAMPING | DAILY REPORT_0526.pdf | Suzuki | Ookawa | 5/26 | PRINT |
| SAVE BINDER AFTER STAMPING | Yamada_DAILY REPORT _20220527.pdf | Yamada | Ookawa | 5/27 | PRINT |
| | | Suzuki | | 5/27 | Waiting |
| SIGN, SCAN, AND TRANSMIT TO ACCOUNTING | EXPENSES APPLICATION.docx | Yamada | PEOPLE WHO CAME TO WORK | 5/27 | COMPLETE |

1301, 1302, 1303, 1304, 1305, 1306, 1307

INFORMATION PROCESSING APPARATUS, METHOD, AND NON-TRANSITORY COMPUTER-READABLE STORAGE MEDIUM STORING PROGRAM

BACKGROUND OF THE INVENTION

Field of the Invention

The present invention relates to an information processing apparatus capable of executing a message exchange service, a method, and a non-transitory computer-readable storage medium storing a program.

Description of the Related Art

There have been proliferated business chat tools (to be referred to as collaboration tools or message exchange services hereinafter) capable of communication by a chat. Japanese Patent Laid-Open No. 2020-47000 describes an information processing system capable of submitting a print job directly from a collaboration tool to an MFP.

SUMMARY OF THE INVENTION

The present invention provides a mechanism capable of easily confirming a job ticket on a message exchange service.

The present invention in one aspect provides a non-transitory computer-readable storage medium storing a program configured to cause a computer of an information processing apparatus to function as: a specifying unit configured to specify, of messages received by a message exchange service between users, a message to which a job ticket for executing a job is attached; an acquisition unit configured to acquire information of the job ticket attached to the message specified by the specifying unit; and a display control unit configured to display, in the message exchange service, a list of information of the job ticket acquired by the acquisition unit.

According to the present invention, it is possible to easily confirm a job ticket on a message exchange service.

Further features of the present invention will become apparent from the following description of exemplary embodiments with reference to the attached drawings.

BRIEF DESCRIPTION OF THE DRAWINGS

FIGS. 4A and 4B are views showing the configuration of a program of the information processing apparatus;

FIG. 9 is a view showing a screen that displays a list of workflow tickets;

FIG. 10 is a flowchart showing processing of transmitting a job to an image forming apparatus;

FIG. 11 is a flowchart showing processing of displaying a list of workflow tickets;

FIG. 13 is a view showing a screen that displays a list of workflow tickets.

DESCRIPTION OF THE EMBODIMENTS

Figure 1A:
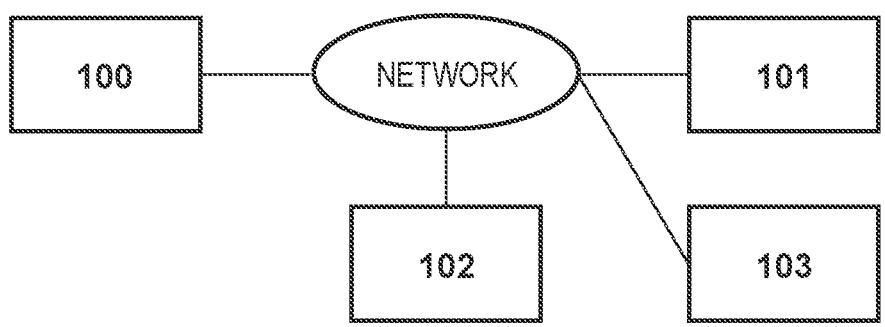
FIGS. 1A and 1B are views showing the configuration of a communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

There is assumed a case where a user who desires execution of a job transmits a message with a job ticket attached to another user (receiver) on a message exchange service. In this case, on the receiver side, there is a demand for a mechanism capable of easily confirming the job ticket on the message exchange service.

According to the present disclosure, it is possible to easily confirm the job ticket on the message exchange service.

First Embodiment

Figure 1B:
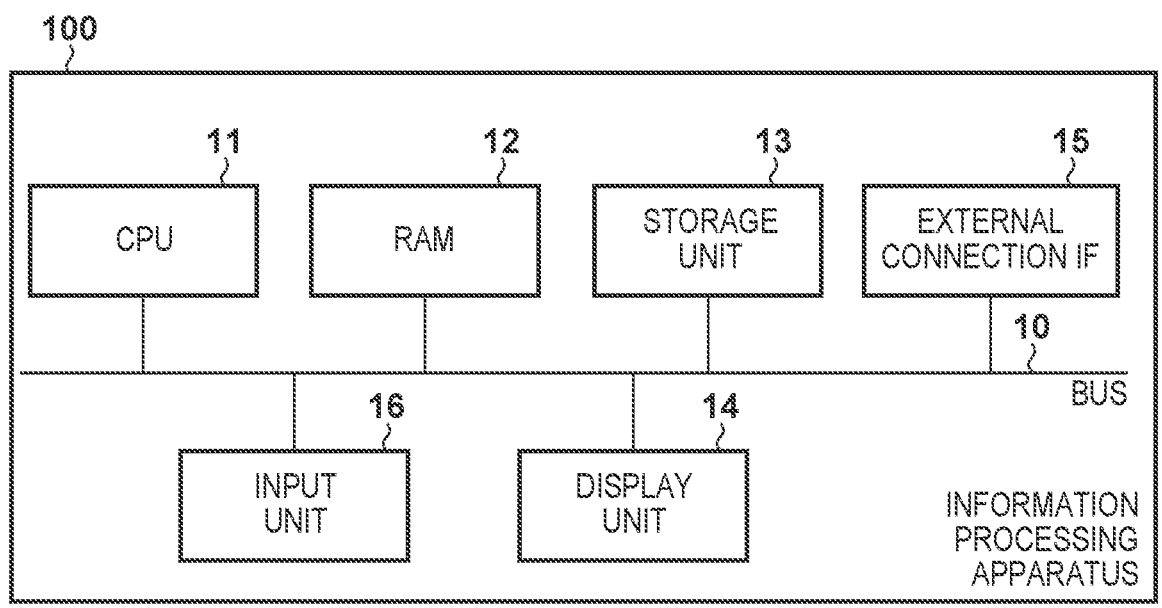

FIG. 1A is a view showing an example of the configuration of a communication system according to this embodiment, and FIG. 1B is a view showing an example of the hardware configuration of an information processing apparatus. As shown in FIG. 1A, the communication system includes information processing apparatuses 100 and 101 each having the configuration of a general-purpose information processing apparatus such as a PC, and a server 102. The apparatuses are communicably connected to each other via a network such as the Internet.

The server 102 is a server that provides a communication service (message exchange service) by a collaboration tool such as Microsoft Teams® or Slack®. Remote works are popular in recent years, and communication between employees in a remote work is generally done by the above-described collaboration tool. There is case where a user A working at home in a remote work requests a user B near an image forming apparatus 103 in the office to print or scan a document. In such a case, for example, the user A creates a workflow ticket including print settings in executing a job by the image forming apparatus 103. The user A transmits the created workflow ticket to the user B via a collaboration tool. In this embodiment, the information processing apparatus 100 is a PC operated by the user A, and the information processing apparatus 101 is a PC operated by the user B. Also, the information processing apparatus 100 exists in the home of the user A, and the information processing apparatus 101 and the image forming apparatus 103 exist in the office.

Note that the workflow ticket in this embodiment is one of job tickets that are set to execute jobs for the image forming apparatus 103. Also, in this embodiment, the term "workflow" includes not only a workflow system with a workflow server that manages each step but also a workflow for circulating a document output as paper among users. The communication system shown in FIG. 1A may include another device. For example, a workflow server configured to manage a workflow or a file server may be included as another server. FIG. 1B shows an example of the hardware configuration of the information processing apparatus 100, the information processing apparatus 101, and the server 102. The information processing apparatus 100 will be described below as a representative example of the apparatuses. A CPU 11 executes a program corresponding to each of applications (to described later) stored in a storage unit 13 or program execution environments, thereby comprehensively controlling the information processing apparatus 100. The storage unit 13 is a nonvolatile memory such as a ROM, a Hard Disk Drive (HDD), or a Solid State Drive (SSD). The operation of the information processing apparatus 100 according to this embodiment is implemented by, for example, the CPU 11 reading out a program stored in the storage unit 13 into a RAM 12 that is a volatile memory and executing the program.

Also, the RAM 12, the storage unit 13, a display unit 14, an external connection interface (IF) 15, and an input unit 16 are connected to the CPU 11 via a bus 10. The input unit 16 includes a keyboard, a mouse, and the like and can accept a user operation. The display unit 14 is a display configured to display various kinds of user interface screens. Note that the display unit 14 and the input unit 16 may be integrally formed like a touch panel. The external connection IF 15 has a configuration according to the medium of an external network and enables communication with the network. Note that the external network may include a wired network, a wireless network, or both of these.

The information processing apparatus 100, the information processing apparatus 101, and the server 102 may have configurations different from each other. Also, the information processing apparatus 100 is not limited to the configuration shown in FIG. 1B and appropriately has a configuration in accordance with functions that the device applied to the information processing apparatus 100 can implement. For example, a control circuit such as an ASIC that operates in cooperation with the CPU 11 may be formed. There may be a plurality of CPUs 11, and distributed processing may be executed by the plurality of CPUs 11. The information processing apparatus 100 may operate by cooperation of a plurality of apparatuses. At this time, a plurality of CPUs 11 may be distributed to the plurality of apparatuses.

Figure 2:
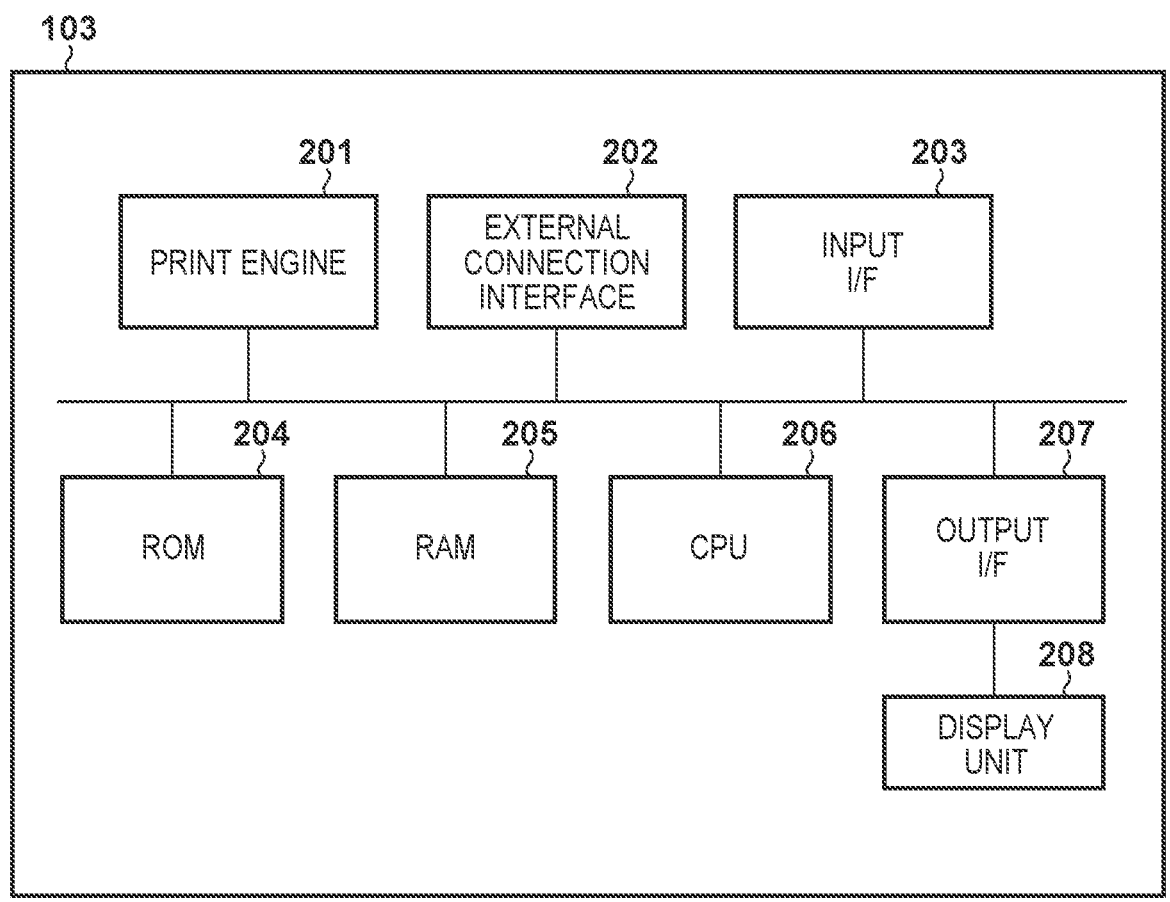
FIG. 2 is a view showing the configuration of an image forming apparatus.

FIG. 2 is a view showing an example of the hardware configuration of the image forming apparatus 103.

The image forming apparatus 103 includes a print engine 201, an external connection interface 202, an input interface 203, a ROM 204, a RAM 205, a CPU 206, an output interface 207, and a display unit 208.

The ROM 204 stores permanent data such as control programs to be executed by the CPU 206, data tables, or the OS program. The external connection interface 202 has a configuration according to the medium of an external network and enables communication with the network. Note that the external network may include a wired network, a wireless network, or both of these.

The RAM 205 is formed by a DRAM that needs a backup power supply. Note that the RAM 205 holds data by receiving power from a data backup power supply (not shown) and can therefore store important data such as a program control variable without volatilizing it. The RAM 205 is also used as the main memory and the work memory of the CPU 206, and also functions as a reception buffer configured to temporarily save a job received from the information processing apparatus 101 or the like. The ROM 204 stores permanent data such as control programs to be executed by the CPU 206, data tables, or the OS program. In this embodiment, each control program stored in the ROM 204 performs software execution control such as scheduling, task switch, or interrupt processing under the management of an embedded OS stored in the ROM 204. The ROM 204 is also provided with a memory area for storing data that needs to be held even without power supply, such as the setting information of the image forming apparatus 103 or the management data of the image forming apparatus 103.

The CPU 206 is a system control unit and comprehensively controls the entire image forming apparatus 103. Based on information stored in the RAM 205 or a job received from the information processing apparatus 101 or the like, the print engine 201 forms an image on a print medium such as paper using a printing material such as ink and outputs it as a printed product. Note that the print engine 201 can have a configuration according to various printing methods such as an inkjet printing method and an electrophotographic method.

The input interface 203 is an interface configured to accept data input or operation instructions from the user and is formed by a physical keyboard, buttons, a touch panel, and the like. Note that the output interface 207 to be described later and the input interface 203 may have the same configuration, and output of a screen and acceptance of an operation from the user may be done by the same configuration. The output interface 207 is a control interface used by the display unit 208 to display data or notify the state of the image forming apparatus 103.

The display unit 208 is formed by a Light Emitting Diode (LED) or a Liquid Crystal Display (LCD), and displays data or notifies the state of the image forming apparatus 103. Note that input from the user may be accepted via the display unit 208 by installing, on the display unit 208, a software keyboard including numeric value input keys, mode setting keys, a determination key, a cancel key, a power key, and the like.

The components of the image forming apparatus 103 are not limited to those shown in FIG. 2, and components according to functions executable by the image forming apparatus 103 are included as needed. For example, the image forming apparatus 103 may be formed as a Multi Function Peripheral (MFP) having a scan function and a facsimile function. Also, in this embodiment, the workflow ticket will be explained as a job ticket for executing a print job. However, it may be a job ticket for executing a job according to a function executable by the image forming apparatus 103.

Figure 3:
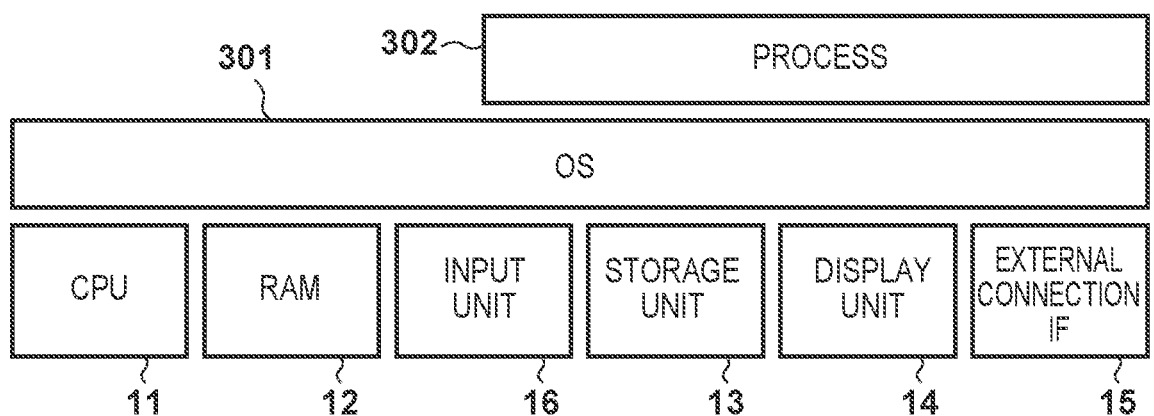
FIG. 3 is a view showing a system configuration built on an information processing apparatus.

FIG. 3 is a view showing an example of a system configuration built on the information processing apparatuses 100 and 101. An Operating System (OS) 301 is software that is the base of the entire system. A process 302 is a unit of execution for operating software on the OS 301. Each program to be described later with reference to FIG. 4A operates as the process 302 on the OS 301. The OS 301 controls each hardware portion shown in FIG. 1B.

FIG. 4A is a view showing an example of the configuration of a program according to this embodiment. The program shown in FIG. 4A is formed in each of the information processing apparatus 100 and the information processing apparatus 101, and the following description will be made assuming that the program is formed in the information processing apparatus 100 as a representative example. Each program shown in FIG. 4A operates on the process 302 shown in FIG. 3. A collaboration tool 410 is, for example, Microsoft Teams® or Slack®, and includes a message management portion 411 that manages a file or a chat transmitted/received between users. A workflow plug-in 400 is a plug-in program incorporated in the collaboration tool 410, and can be activated by clicking an icon on the collaboration tool 410.

In this embodiment, the workflow plug-in 400 includes a workflow ticket management portion 401, a workflow ticket creation portion 402, a workflow ticket display portion 403, a workflow ticket execution portion 404, and a plug-in cooperation portion 405. The workflow ticket management portion 401 manages a workflow ticket 420 received from the outside by the collaboration tool 410. The workflow ticket creation portion 402 generates the workflow ticket 420 based on print settings designated by the user. The workflow ticket display portion 403 performs display control to display a screen associated with the workflow ticket 420 on the collaboration tool 410. The workflow ticket execution portion 404 creates a job based on the print settings of the workflow ticket 420, and transmits it to the image forming apparatus 103. The plug-in cooperation portion 405 causes the workflow ticket management portion 401 to the workflow ticket execution portion 404 to cooperate with the collaboration tool 410. By this cooperation, the functions of the workflow ticket management portion 401 to the workflow ticket execution portion 404 are implemented in the collaboration tool 410.

The workflow plug-in 400 is not limited to the configuration shown in FIG. 4A. For example, the workflow ticket creation portion 402 may be formed separately as a ticket creation application. In this case, the plug-in cooperation portion 405 causes the ticket creation application to cooperate with the collaboration tool 410. Also, the workflow ticket execution portion 404 may be formed separately as a ticket execution application. In this case, the plug-in cooperation portion 405 causes the ticket execution application to cooperate with the collaboration tool 410. By this cooperation as well, the functions of the applications are implemented in the collaboration tool 410.

In this embodiment, a description will be made assuming that the workflow ticket execution portion 404 transmits a generated job to the image forming apparatus 103. However, another configuration is also possible. For example, the workflow ticket execution portion 404 may transmit a generated job to the image forming apparatus 103 using a job transmission function of a driver operating on the OS 301.

FIG. 4B is a view showing an example of the workflow ticket 420 created by the workflow ticket creation portion 402. The workflow ticket 420 created by the workflow ticket creation portion 402 can be shared with other users on a chat or a channel of the collaboration tool 410.

The workflow ticket 420 includes workflow information portion 421 and document information portion 422. The workflow information portion 421 holds information concerning a workflow. Here, information concerning a workflow includes, for example, print settings, information of a folder to be saved after scan, and the task name of the workflow. The workflow information portion 421 also includes the status information of the job, and the name of the creator of the workflow ticket. For example, the workflow ticket 420 may include, as the status information, information representing whether the workflow ticket has already been executed by the workflow ticket execution portion 404 as will be described below.

If the workflow ticket 420 is executed, concerning the executed workflow ticket 420, the workflow ticket execution portion 404 notifies the workflow ticket management portion 401 that the workflow ticket has already been executed. Upon receiving the notification, the workflow ticket management portion 401 adds information representing that the workflow ticket has already been executed to the workflow information portion 421 of the corresponding workflow ticket 420. The workflow ticket management portion 401 stores the notified fact that the workflow ticket 420 has already been executed, and instructs the workflow ticket display portion 403 to display, in the list display of workflow tickets, that the workflow ticket 420 has already been executed. The list display of workflow tickets will be described later.

The document information portion 422 holds the information of a document as the execution target of the workflow ticket 420. The document information portion 422 may be, for example, the print target document itself or the file path of the document held on an external file server.

This embodiment assumes communication between the information processing apparatus 100 of the user A and the information processing apparatus 101 of the user B by the collaboration tool 410. Note that the user B sometimes communicates not only with the user A but also with a plurality of users by the collaboration tool 410. In this embodiment, a case will be described, where the user A logs in to the collaboration tool 410, creates the workflow ticket 420 for printing a daily report, attaches it to a chat message, and transmits it to the user B in the office where the image forming apparatus 103 is installed.

If there are many home users away from the office, the user B receives many work requests via chat messages, and management of the requests is difficult. Also, the user A and the user B have many opportunities to transmit/receive chat messages for business consultation other than daily report printing. Hence, a chat message (to be referred to as a message hereinafter) of a work request may escape the notice of the user B, and the user B may miss the work request from the user A. In this embodiment, the workflow plug-in 400 in the information processing apparatus 101 of the user B displays a list of the information of the workflow tickets 420 attached to messages transmitted from a plurality of users. This can prevent the user B from missing the work request from the user A.

In this embodiment, the workflow plug-in 400 on the information processing apparatus 100 accepts an input operation of the user A, designates the print settings of the image forming apparatus 103 or a print target document, and creates the workflow ticket 420. The workflow plug-in 400 on the information processing apparatus 100 attaches the created workflow ticket 420 to a message of the collaboration tool 410 and transmits it to the information processing apparatus 101.

On the other hand, the workflow plug-in 400 on the information processing apparatus 101 detects the workflow ticket 420 received from the outside in the collaboration tool 410. The workflow plug-in 400 displays, in the collaboration tool 410, a list of the information of the workflow tickets 420 (to be referred to as a list of the workflow tickets 420 hereinafter). The user B selects an arbitrary workflow ticket 420 in the list of the workflow tickets 420 and instructs execution. Upon accepting the execution instruction, the workflow plug-in 400 generates a job by executing the selected workflow ticket 420 and transmits the generated job to the image forming apparatus 103.

Processing from creating the workflow ticket 420 in the information processing apparatus 100 of the user A until displaying the list of the workflow tickets 420 in the information processing apparatus 101 of the user B will be described.

Figure 5:
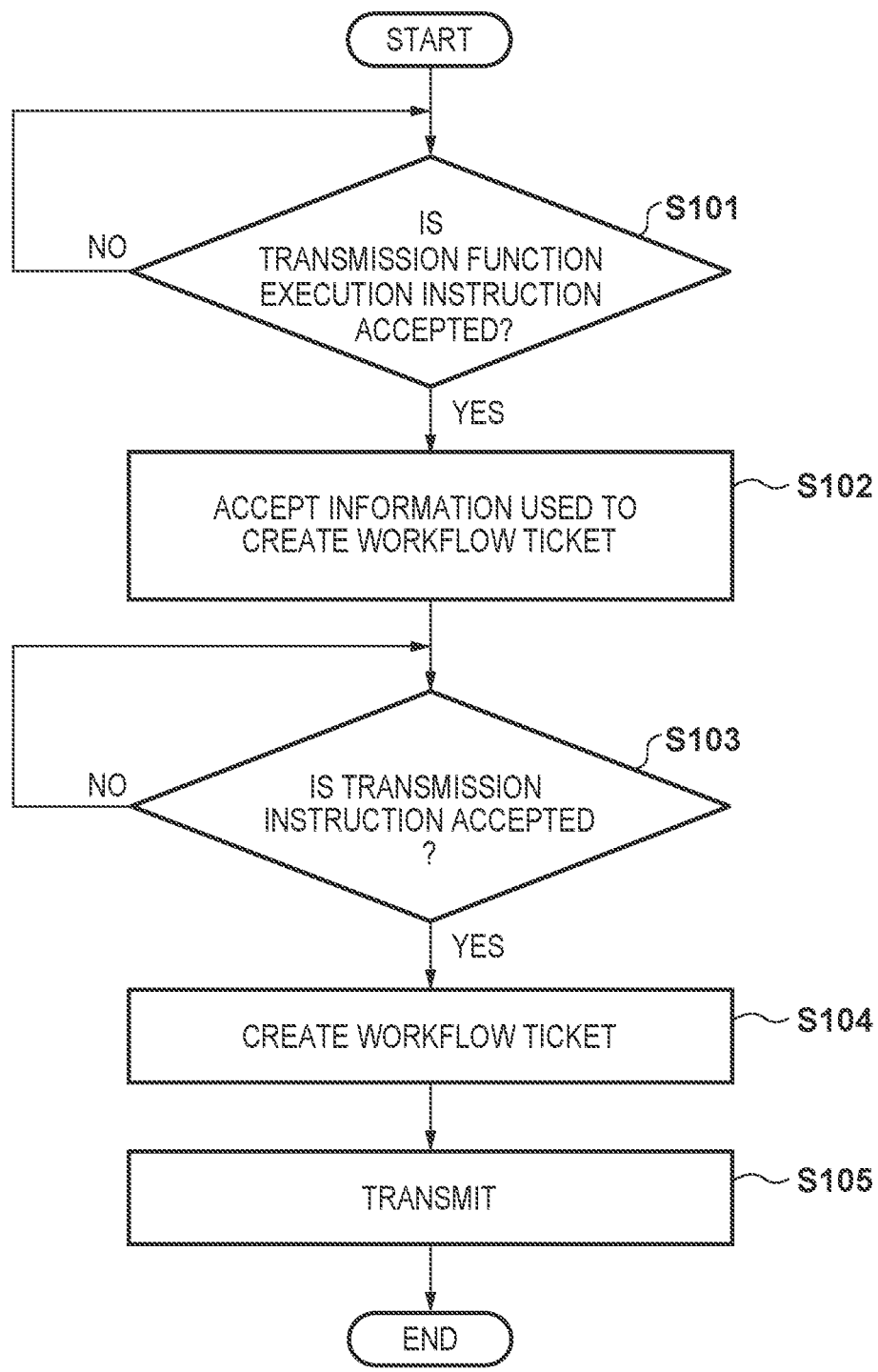
FIG. 5 is a flowchart showing processing of creating a workflow ticket and transmitting it.

FIG. 5 is a flowchart showing processing of creating the workflow ticket 420 and transmitting it. Processing shown in FIG. 5 is implemented by, for example, the CPU 11 of the information processing apparatus 100 of the user A reading out a program stored in the storage unit 13 to the RAM 12 and executing it. Processing shown in FIG. 5 is started when the user A logs in to the collaboration tool 410.

In step S101, the workflow ticket management portion 401 determines whether a transmission function execution instruction is accepted. Here, the transmission function is a function of creating the workflow ticket 420 and transmitting it to another user by the message exchange service function of the collaboration tool 410. As described above, the workflow plug-in 400 is incorporated as a plug-in program in the collaboration tool 410. Hence, the user A can instruct execution of the transmission function by, for example, clicking the icon of the transmission function corresponding to the plug-in program. The processing of step S101 is repeated until it is determined that the transmission function execution instruction is accepted. If it is determined that the transmission function execution instruction is accepted, the process advances to step S102.

In step S102, the workflow ticket management portion 401 instructs the workflow ticket display portion 403 to display a screen configured to create the workflow ticket 420. The workflow ticket display portion 403 then displays the screen configured to create the workflow ticket in the collaboration tool 410. The workflow ticket display portion 403 accepts, via the displayed screen, information used to create the workflow ticket.

Figure 6:
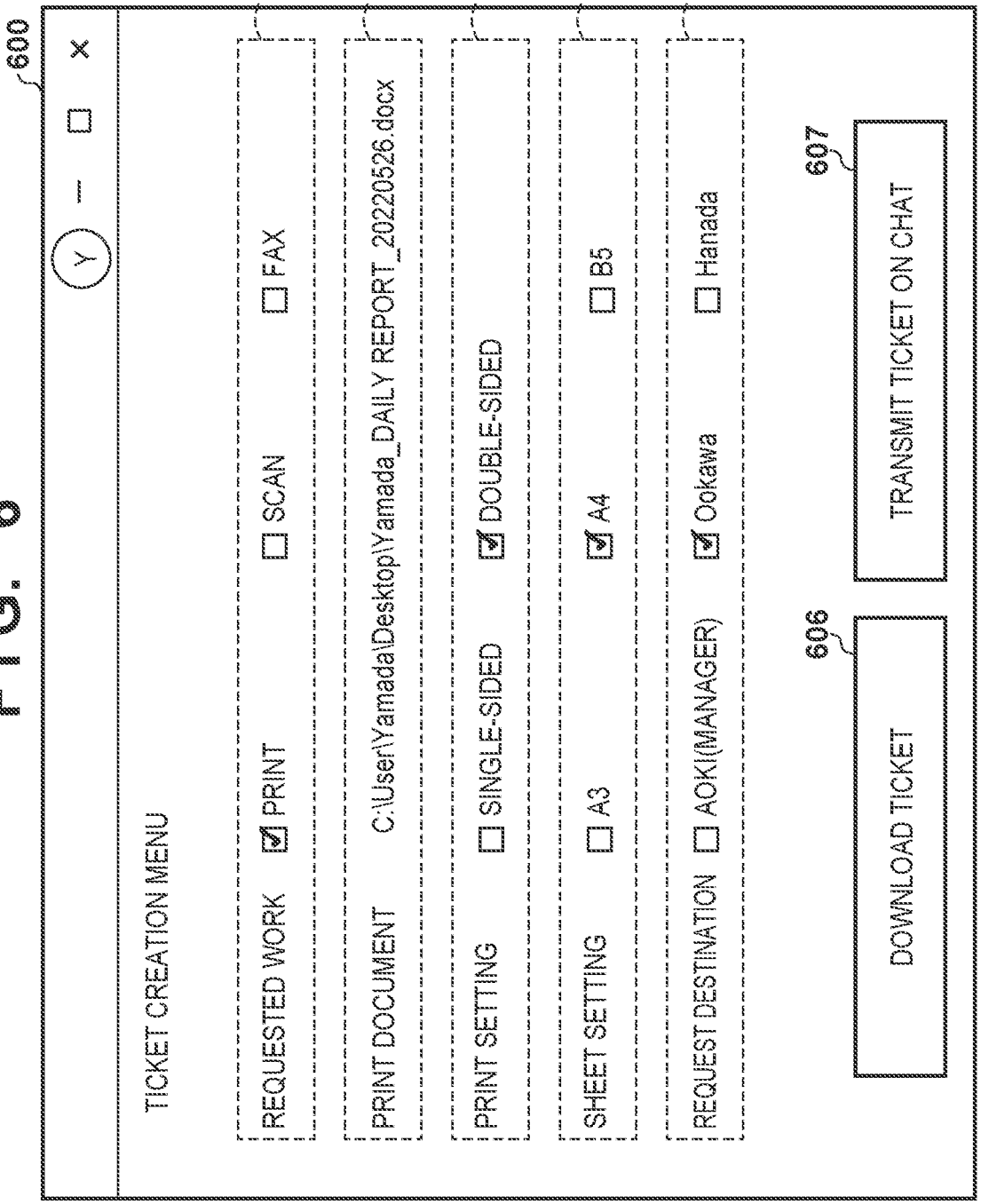
FIG. 6 is a view showing a screen configured to create a workflow ticket.

FIG. 6 is a view showing an example of the screen configured to create the workflow ticket 420. On a screen 600, setting items needed to create the workflow ticket 420 are displayed. An item 601 is an item used to set the contents of a work to be requested of the user B. In FIG. 6, "print", "scan", and "FAX" are displayed as an example. In this example, "print" is selected. If "print" is selected, the workflow ticket 420 for executing printing by the image forming apparatus 103 is created. An item 602 is an item displayed when "print" is selected in the item 601, and the user A can designate the file path of the print target document.

Items 603 and 604 are items representing print settings to be executed by the image forming apparatus 103. In FIG. 6, "single-sided" and "double-sided" are displayed as an example. In this example, "double-sided" is selected. Also, in FIG. 6, "A3", "A4", and "B5" are displayed as an example. In this example, "A4" is selected. An item 605 is an item used to designate the transmission destination of the workflow ticket 420. In FIG. 6, "Aoki (manager)", "Okawa", and "Hanada" are displayed as an example. In this example, "Okawa" is selected. Note that the selection candidates of the item 605 may be acquired from organization information incorporated in the collaboration tool 410.

A button 606 is a button used to download, to the information processing apparatus 100, the workflow ticket 420 created based on the contents of the items 601 to 605. The user A can transmit the workflow ticket 420 downloaded to the information processing apparatus 100 by pressing the button 606 to the user B by another application, for example, email. A button 607 is a button used to transmit the workflow ticket 420 created based on the contents of the items 601 to 605 to the transmission destination of the item 605 by the collaboration tool 410. In this example, the user A is assumed to press the button 607.

In step S103, the workflow ticket display portion 403 determines whether a transmission instruction is accepted. Here, the transmission instruction is an instruction to transmit the created workflow ticket 420 to the transmission destination selected in the item 605 by the message of the collaboration tool 410 and is, for example, pressing of the button 607. The processing of step S103 is repeated until it is determined that the transmission instruction is accepted. If it is determined that the transmission instruction is accepted, the process advances to step S104.

In step S104, the workflow ticket display portion 403 notifies the workflow ticket management portion 401 that the transmission instruction is accepted. The workflow ticket management portion 401 then instructs the workflow ticket creation portion 402 to create the workflow ticket 420 based on the information accepted in step S102. Upon receiving the instruction from the workflow ticket management portion 401, the workflow ticket creation portion 402 creates the workflow ticket 420 based on the information accepted in step S102. More specifically, for example, the workflow ticket 420 for causing the image forming apparatus 103 to print the document designated in the item 602 by double-sided printing in A4 is created.

In step S105, the workflow ticket creation portion 402 notifies the workflow ticket management portion 401 that the workflow ticket 420 is created. Upon receiving the notification from the workflow ticket creation portion 402, the workflow ticket management portion 401 requests the collaboration tool 410 to attach the created workflow ticket 420 to a message and transmit it to the transmission destination selected in the item 605. The request includes the created workflow ticket 420 and the information of the transmission destination of the item 605. Upon receiving the request from the workflow plug-in 400, the collaboration tool 410 activates a new message screen and accepts creation of a message from the user A. Upon accepting the creation of the message, the collaboration tool 410 attaches the workflow ticket 420 created by the workflow plug-in 400 and transmits the message to the transmission destination. The message is transmitted to the information processing apparatus 101 via the server 102.

Figure 7:
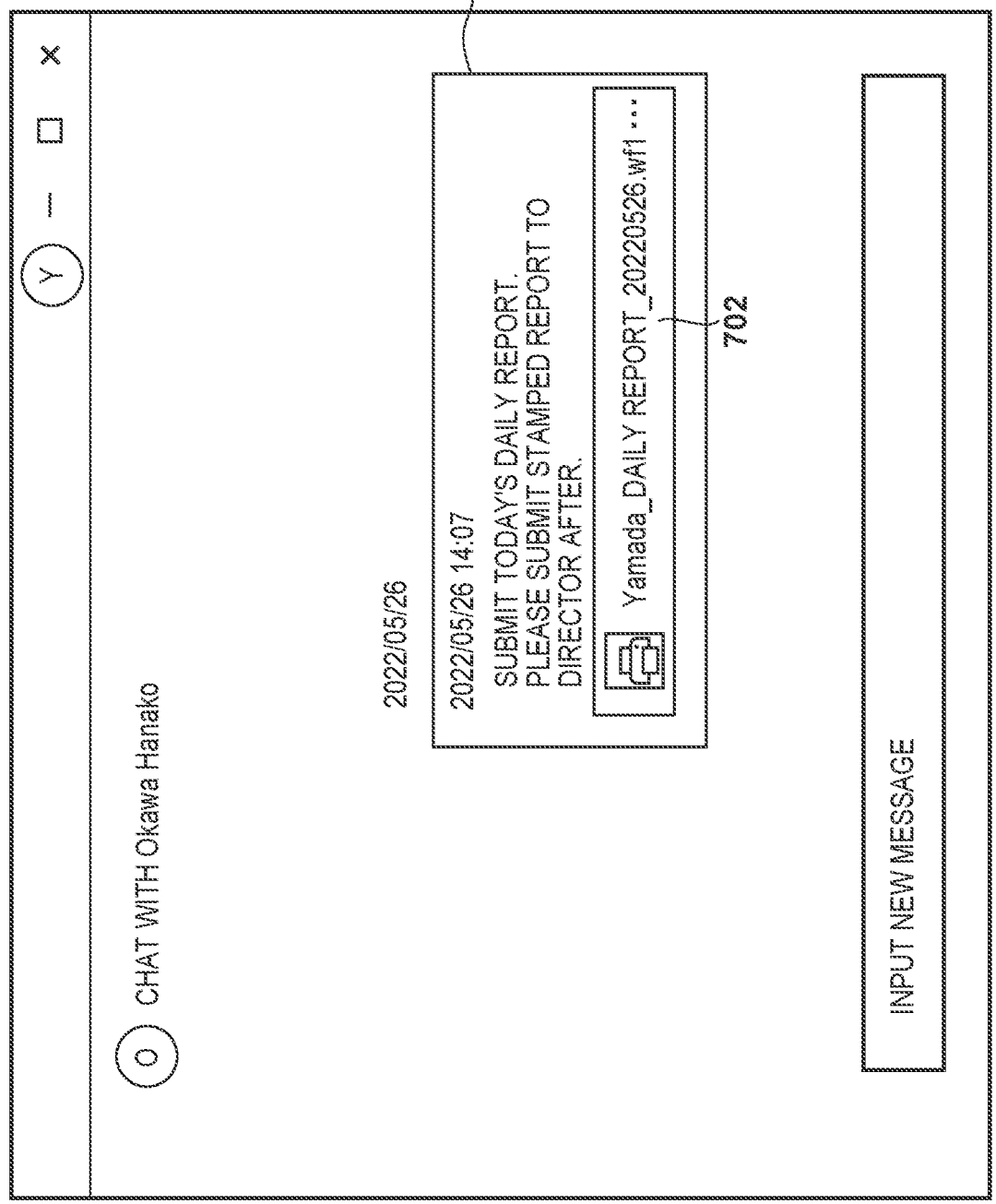
FIG. 7 is a view showing a message to which a workflow ticket is attached.

FIG. 7 is a view showing an example of the transmitted message to which the created workflow ticket 420 is attached. FIG. 7 shows a state in which a message 701 to which a workflow ticket 702 created in step S104 is attached is transmitted to Okawa.

Figure 8:
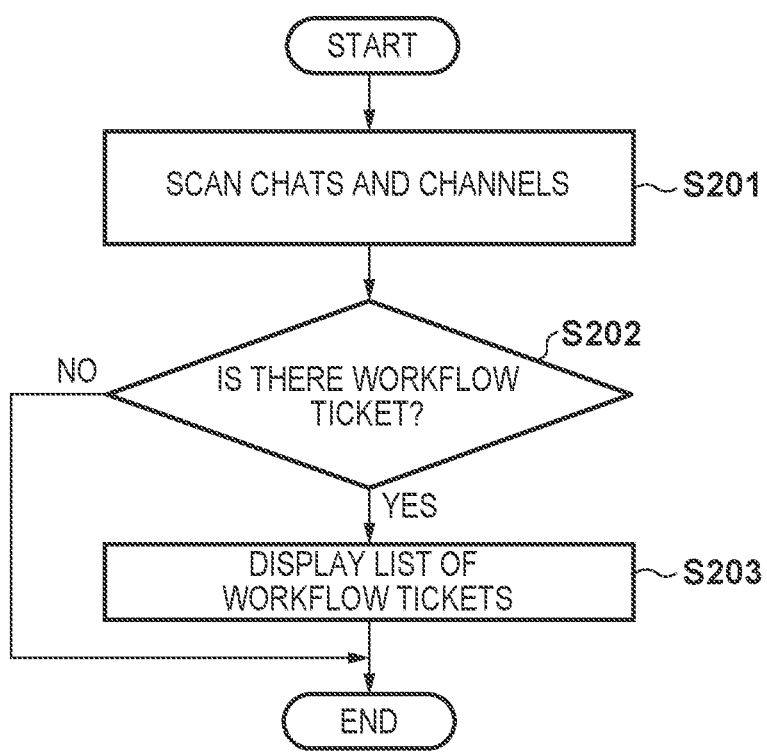
FIG. 8 is a flowchart showing processing of displaying a list of workflow tickets.

FIG. 8 is a flowchart showing processing of displaying a list of the workflow tickets 420. Processing shown in FIG. 8 is implemented by, for example, the CPU 11 of the information processing apparatus 101 of the user B reading out a program stored in the storage unit 13 to the RAM 12 and executing it. Processing shown in FIG. 8 is started when the user B logs in to the collaboration tool 410.

In step S201, the workflow ticket management portion 401 scans all chats and all channels with the user B participating therein at a predetermined time interval. The scan may be executed not at the predetermined time interval but every time a new message is received.

In step S202, the workflow ticket management portion 401 determines whether the workflow ticket 420 exists in the scanned chats and channels. The determination of step S202 may be done by acquiring the file extension of the document attached to the message and determining whether it is a file extension indicating the workflow ticket 420. If it is determined that the workflow ticket 420 does not exist, the processing shown in FIG. 8 is ended. If it is determined that the workflow ticket 420 exists, the process advances to step S203.

In step S203, the workflow ticket management portion 401 instructs the workflow ticket display portion 403 to acquire the information of the workflow ticket 420 and display it. Upon accepting the instruction from the workflow ticket management portion 401, the workflow ticket display portion 403 acquires the information of the workflow ticket 420 and displays a list of the workflow tickets 420. Here, the information of the workflow ticket 420 is, for example, information included in the workflow information portion 421 and the document information portion 422.

FIG. 9 is a view showing an example of a screen that displays a list of the workflow tickets 420. In the screen shown in FIG. 9, a task name 901, a document name 902, a requester 903, and a person 904 in charge are information that can be acquired from the workflow ticket 420. In FIG. 9, for example, "Okawa" in the column of the person 904 in charge corresponds to the user B. Also, for example, "Yamada" in the column of the requester 903 shown in FIG. 9 corresponds to the user A. FIG. 9 shows an example in which not only the user A but also another user "Suzuki" transmits a work request to the user B by a message.

In this embodiment, the workflow ticket display portion 403 displays the information of the workflow ticket 420 and also displays status information concerning the execution state thereof. For example, if the workflow ticket 420 is not executed yet, information representing that the execution instruction can be accepted, more specifically, a print button 905 is displayed. If the user presses the print button 905, a job is created based on the information of the corresponding workflow ticket 420 and transmitted to the image forming apparatus 103. For the workflow ticket 420 on the lowest stage in FIG. 9, information 906 representing that execution of the job is completed is displayed.

As shown in FIG. 9, in this embodiment, since the list of the workflow tickets 420 is displayed, a message of a work request can be prevented from mixing in the display of messages without the workflow ticket 420 attached. Note that instead of displaying the results obtained based on all chats and all channels, the screen of the list of the workflow tickets 420 may be able to filter only specific chats or specific channels and display the results obtained based on these. Filtering may be performed based on an element such as a work request date. For example, filtering may be performed based on the request date, like a button 907 in FIG. 9.

If it is determined in step S202 that the workflow ticket 420 does not exist, the processing shown in FIG. 8 is ended. That is, in this case, the list of the workflow tickets 420 as shown in FIG. 9 is not displayed.

That is, according to this embodiment, for example, pieces of information of the workflow tickets 420 attached to messages received from the outside in the collaboration tool 410 are displayed as a list at a predetermined time interval. This can improve the convenience in managing a workflow ticket for the receiver (user B) of a message.

Processing of the workflow plug-in 400 of the information processing apparatus 101 of the user B executing the workflow ticket 420 and transmitting a job to the image forming apparatus 103 will be described next.

FIG. 10 is a flowchart showing processing of transmitting a job to the image forming apparatus 103. Processing shown in FIG. 10 is implemented by, for example, the CPU 11 of the information processing apparatus 101 of the user B reading out a program stored in the storage unit 13 to the RAM 12 and executing it. Processing shown in FIG. 10 is started in a state in which the list of the workflow tickets 420 is displayed.

In step S301, upon detecting pressing of the print button 905, the workflow ticket management portion 401 instructs the workflow ticket execution portion 404 to acquire the information of the workflow ticket 420 and execute it. Upon receiving the instruction from the workflow ticket management portion 401, the workflow ticket execution portion 404 acquires information from the workflow information portion 421 and the document information portion 422 of the workflow ticket 420 whose print button 905 is pressed. In step S302, the workflow ticket execution portion 404 creates a job based on setting information included in the workflow ticket 420 and transmits the job to the image forming apparatus 103. Here, the setting information is, for example, information of the items 603 and 604 in FIG. 6.

In step S303, the workflow ticket execution portion 404 determines whether the transmission of the job to the image forming apparatus 103 is completed. The determination of step S303 may be executed based on, for example, a response from the image forming apparatus 103 or timeout after the job transmission. Upon determining that the transmission of the job is completed, in step S304, concerning the executed workflow ticket 420, the workflow ticket execution portion 404 notifies the workflow ticket management portion 401 that the workflow ticket has already been executed. Upon receiving the notification, the workflow ticket management portion 401 adds information representing that the workflow ticket has already been executed to the workflow information portion 421 of the corresponding workflow ticket 420. The workflow ticket management portion 401 stores the notified fact that the workflow ticket 420 has already been executed, and instructs the workflow ticket display portion 403 to display, in the list display of workflow tickets, that the workflow ticket 420 has already been executed. Upon receiving the instruction from the workflow ticket management portion 401, the workflow ticket display portion 403 updates the status information corresponding to the workflow ticket 420 for which the job transmission is completed from "print" to "completed", and then ends the processing shown in FIG. 10. The image forming apparatus 103 that has received the job executes the job. More specifically, for example, the document designated in the item 602 is printed in accordance with the settings defined in the items 603 and 604 shown in FIG. 6.

On the other hand, if it is determined in step S303 that the transmission of the job is not completed, the processing shown in FIG. 10 is ended. Note that at this time, the workflow ticket execution portion 404 may notify the workflow ticket management portion 401 that the transmission of the job is not completed. Upon receiving the notification, the workflow ticket management portion 401 adds information representing that no job is transmitted to the workflow information portion 421 of the corresponding workflow ticket 420. The workflow ticket management portion 401 stores the notified fact that no job is transmitted for the workflow ticket 420, and instructs the workflow ticket display portion 403 to display, in the list display of workflow tickets, that no job is transmitted. The workflow ticket display portion 403 updates the status information of the corresponding workflow ticket 420 from "print" to "no job transmitted".

As described above, according to this embodiment, the list of the workflow tickets 420 is displayed on the collaboration tool 410. With this configuration, it is possible to improve the convenience in managing a workflow ticket for the user who is requested to do a work via a message. Also, in this embodiment, the workflow ticket 420 has been described as a job ticket for executing single processing, that is printing. However, it may be a job ticket for continuously executing a plurality of processes managed on a workflow server.

Second Embodiment

The second embodiment will be described below concerning differences from the first embodiment. In the first embodiment, the pieces of information of a plurality of workflow tickets 420 are displayed as a list. In this embodiment, one button 905 is displayed in correspondence with the display of the pieces of information of a plurality of workflow tickets 420 that are judged to be similar. With this configuration, when executing the plurality of workflow tickets 420, the print button 905 need not be pressed a plurality of times, and convenience can further be improved.

FIG. 11 is a flowchart showing processing of displaying a list of the workflow tickets 420 according to this embodiment. Processing shown in FIG. 11 is implemented by, for example, a CPU 11 of an information processing apparatus 101 of a user B reading out a program stored in a storage unit 13 to a RAM 12 and executing it. Processing shown in FIG. 11 is started when the user B logs in to a collaboration tool 410.

In step S401, a workflow ticket management portion 401 scans all chats and all channels with the user B participating therein at a predetermined time interval. The scan may be executed not at the predetermined time interval but every time a new message is received.

In step S402, the workflow ticket management portion 401 determines whether the workflow ticket 420 exists in the scanned chats and channels. The determination of step S402 may be done by acquiring the file extension of a document attached to a message and determining whether it is a file extension indicating the workflow ticket 420. If it is determined that the workflow ticket 420 does not exist, the processing shown in FIG. 11 is ended. If it is determined that the workflow ticket 420 exists, the process advances to step S403.

In step S403, the workflow ticket management portion 401 determines whether similar workflow tickets 420 exist in the scanned chats and channels. In step S403, for example, based on the result of layout analysis such as rectangle extraction or region segmentation, the workflow tickets 420 in which pieces of document information judged to have similar layouts are held in the document information portions 422 may be determined to be similar. For example, there is a case where a plurality of types of templates exist for a daily report or the like. In this case, the workflow tickets 420 in which similar templates are held in the document information portions 422 are determined to be similar. Also, in step S403, for example, the workflow tickets 420 in which pieces of document information judged to have similar file names under a predetermined condition by a prefix search, a suffix search, or including of the same word are held in the document information portions 422 may be determined to be similar.

If it is determined in step S403 that similar workflow tickets 420 do not exist, the process advances to step S405. In this case, in step S405, a list of the workflow tickets 420 is displayed, like step S203 of FIG. 8, and the processing shown in FIG. 11 is then ended. On the other hand, if it is determined in step S403 that similar workflow tickets 420 exist, the process advances to step S404.

In step S404, the workflow ticket management portion 401 rearranges the display rows of the workflow tickets 420 determined to be similar such that a group in which the workflow tickets are adjacent to each other is formed. At this time, only workflow tickets of the same date or week may be put into a group. In step S405, in the rearranged list, the workflow ticket management portion 401 displays one print button for the group of the workflow tickets 420 determined to be similar. After that, the processing shown in FIG. 11 is ended. When performing display in step S405, the workflow ticket management portion 401 may notify the user B that the print button is displayed, using another application such as email.

FIG. 13 is a view showing an example of a screen that displays a list of the workflow tickets 420 according to this embodiment. As shown in FIG. 13, one button 1301 is displayed for the workflow tickets 420 on the rows 1304 and 1305. Note that FIG. 13 shows an example in which the two workflow tickets 420 whose document names include words "daily report" and "0526" are determined to be similar. If the user presses the button 1301, a job is created by the processing shown in FIG. 10 for each of the two workflow tickets 420 and transmitted to an image forming apparatus 103. Note that the workflow ticket 420 with a document name "Yamada_daily report_20220527" on a row 1306 is not determined to be similar to the workflow tickets 420 on the rows 1304 and 1305, and a print button 1302 is independently displayed.

As described above, according to this embodiment, one print button 1301 is created and displayed in correspondence with the plurality of workflow tickets 420 determined to be similar. With this configuration, the user can create and execute the jobs of the plurality of workflow tickets 420 by pressing the print button once, and the convenience can further be improved.

Third Embodiment

The third embodiment will be described below concerning differences from the first and second embodiments. In the second embodiment, a configuration has been described in which one print button 1301 is displayed in correspondence with the plurality of workflow tickets 420 determined to be similar in the list of the workflow tickets 420. In this embodiment, it is possible to urge a user to wait to press a print button until all a plurality of workflow tickets 420 determined to be similar are received.

Figure 12:
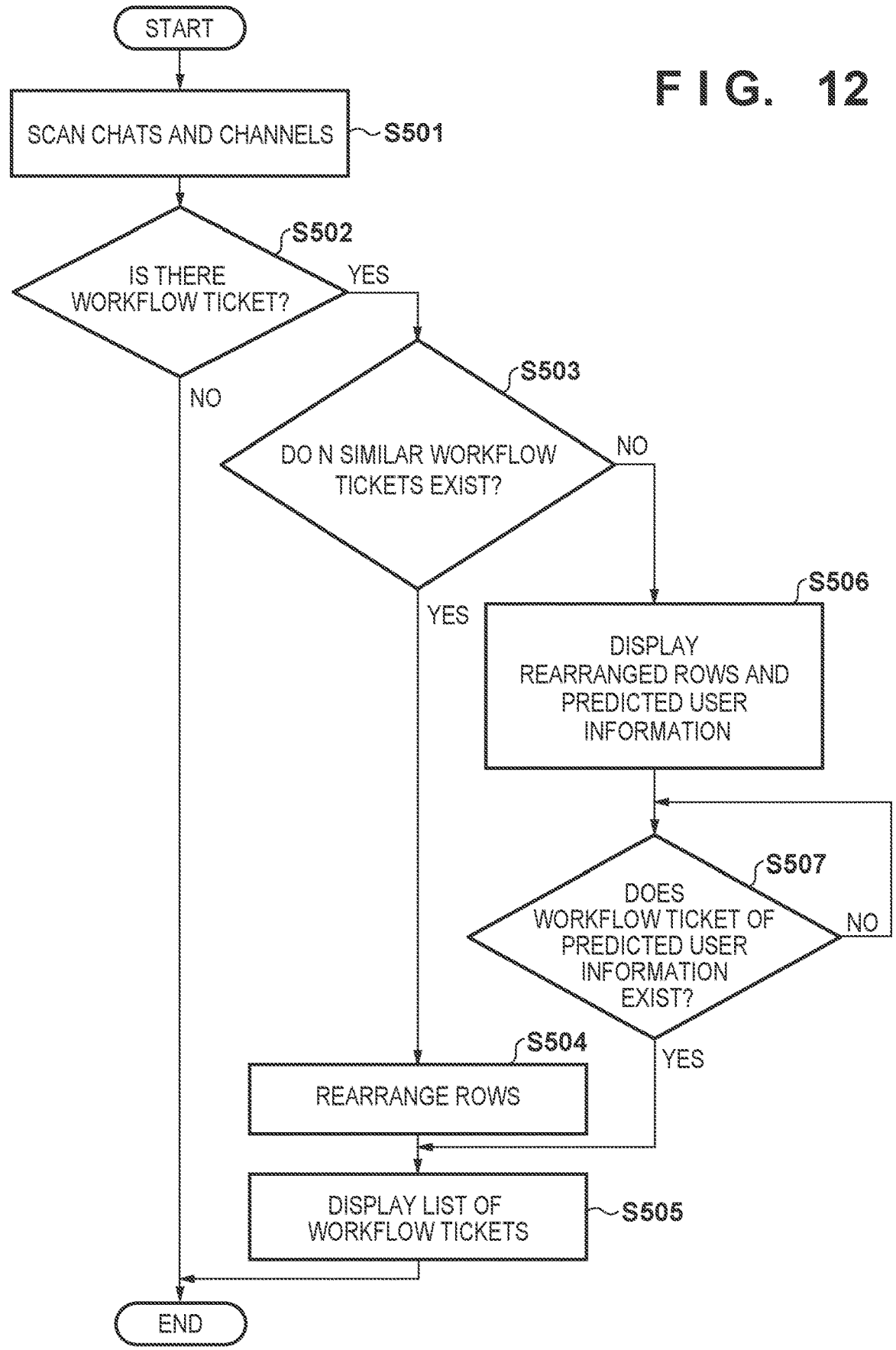
FIG. 12 is a flowchart showing processing of displaying a list of workflow tickets.

FIG. 12 is a flowchart showing processing of displaying a list of the workflow tickets 420 according to this embodiment. Processing shown in FIG. 12 is implemented by, for example, a CPU 11 of an information processing apparatus 101 of a user B reading out a program stored in a storage unit 13 to a RAM 12 and executing it. Processing shown in FIG. 12 is started when the user B logs in to a collaboration tool 410.

In step S501, a workflow ticket management portion 401 scans all chats and all channels with the user B participating therein at a predetermined time interval. The scan may be executed not at the predetermined time interval but every time a new message is received.

In step S502, the workflow ticket management portion 401 determines whether the workflow ticket 420 exists in the scanned chats and channels. The determination of step S502 may be done by acquiring the file extension of a document attached to a message and determining whether it is a file extension indicating the workflow ticket 420. If it is determined that the workflow ticket 420 does not exist, the processing shown in FIG. 12 is ended. If it is determined that the workflow ticket 420 exists, the process advances to step S503.

In step S503, the workflow ticket management portion 401 determines whether N similar workflow tickets 420 exist in the scanned chats and channels. The method for determining similar workflow tickets is the same as that described in step S403 of FIG. 11. Note that "N" may be a predetermined number or may be a number decided by the workflow ticket management portion 401. An example of deciding "N" will be described later.

Upon determining in step S503 that N similar workflow tickets exist, in step S504, the workflow ticket management portion 401 rearranges the display rows of the plurality of workflow tickets 420 determined to be similar such that a group in which the workflow tickets are adjacent to each other is formed. At this time, only workflow tickets of the same date or week may be put into a group. In step S505, in the rearranged list, the workflow ticket management portion 401 displays one print button for the group of the workflow tickets 420 determined to be similar. After that, the processing shown in FIG. 12 is ended.

Processing performed in a case where it is determined in step S503 that N similar workflow tickets do not exist will be described below. First, as a case where "N" is a predetermined number, for example, a case where the members of a team (three users exist) transmit daily reports by messages is assumed. In this case, the three users are known as a user X, a user Y, and a user Z. Such information is often held as organization information in the collaboration tool 410. Hence, the workflow ticket management portion 401 may acquire the value "N" and corresponding user information from the collaboration tool 410. Alternately, when the user of the information processing apparatus 101 activates a workflow plug-in 400 in the collaboration tool 410, a screen configured to set the value "N" representing the number of workflow tickets that can be determined to be similar and corresponding user information may be displayed, and these pieces of information may be accepted.

In the above-described example, assume that the workflow ticket management portion 401 determines, as the result of the processes of steps S501 and S502, that there are daily reports of the user X and the user Y. Note that in this example, the value "N" is "3" for the user X, the user Y, and the user Z. The process advances from step S502 to step S503, and it is determined that the formats of the daily reports of the user X and the user Y are similar to each other. However, since the number of the workflow tickets 420 determined to be similar is "2", the process advances from step S503 to step S506.

Here, the workflow ticket management portion 401 recognizes that the similar workflow tickets 420 are transmitted for the user X, the user Y, and the user Z. That is, since the workflow tickets 420 of the user X and the user Y are already transmitted, the workflow ticket management portion 401 further predicts that the workflow ticket 420 determined to be similar is transmitted from the user Z. In step S506, the workflow ticket management portion 401 instructs a workflow ticket display portion 403 to rearrange the display rows of the plurality of workflow tickets 420 currently determined to be similar and display user information for which transmission is predicted. The workflow ticket display portion 403 rearranges the display rows of the plurality of workflow tickets 420 determined to be similar such that a group in which the workflow tickets are adjacent to each other is formed. The workflow ticket management portion 401 adds a row for displaying the user information for which transmission is predicted as a row adjacent to the group and displays it in the list of the workflow tickets 420.

A row 1307 in FIG. 13 is user information added and displayed in step S506. As the user information, a user name "Suzuki" is displayed. Also, on the row 1307, "Waiting" is displayed as a display 1303. When this display is performed, it is possible to make the user wait to press the print button 1302. Also, for the plurality of users who transmit the plurality of workflow tickets 420 determined to be similar, the user of the information processing apparatus 101 can perform processing at once, instead of performing processing at an interval.

In step S507, the workflow ticket management portion 401 determines whether the workflow ticket 420 associated with the user information for which transmission is predicted exists (is received). Here, if it is determined that the workflow ticket 420 does not exist, the process of step S507 is repeated. That is, the display of "Waiting" of the display 1303 in FIG. 13 is maintained. On the other hand, if it is determined that the workflow ticket 420 exists, in step S505, in the rearranged list, the workflow ticket management portion 401 displays one print button for the group of the plurality of workflow tickets 420 determined to be similar. That is, the display 1303 in FIG. 13 is stopped, and one print button is displayed for a row 1306 and the row 1307. At this time, a print button for another group displayed adjacent to the group of the plurality of workflow tickets 420 determined to be similar is sometimes displayed. If the print button is not executed yet, one print button may be displayed for the plurality of groups. For example, the display 1303 in FIG. 13 may be stopped, and one print button may be displayed for the rows 1304 to 1307. When stopping the display of "Waiting" and displaying the print button, the workflow ticket management portion 401 may notify the user B that the print button is displayed.

As described above, according to this embodiment, if there exist a plurality of users who transmit the plurality of workflow tickets 420 determined to be similar, the work efficiency of the user on the receiving side can be improved. In the above description, the display of "Waiting" is maintained until it is determined in step S507 that the workflow ticket 420 exists. However, the display of "Waiting" may be stopped based on the elapse of a predetermined time.

Another a case where it is determined in step S503 that N similar workflow tickets do not exist will be described below. The workflow plug-in 400 may hold a database in which the value "N", corresponding user information, and the information of the workflow ticket 420 are associated with each other. For example, information about the group of the plurality of workflow tickets 420 determined to be similar in step S403 may be accumulated in the workflow plug-in 400. Here, the information of the workflow ticket 420 is, for example, information included in a workflow information portion 421 and a document information portion 422. Upon determining in step S502 that the workflow ticket 420 exists, the workflow ticket management portion 401 determines whether the similar workflow tickets 420 exist, like step S403 of FIG. 11. Upon determining that the similar workflow tickets 420 exist, based on the information of the workflow tickets 420, the workflow ticket management portion 401 searches the database for a group including the combination of the pieces of information of similar workflow tickets. If a combination exists, the workflow ticket management portion 401 acquires the value "N" and corresponding user information for the group including the combination and performs the determination of step S503. The rest is the same as described above. The case of this example is, for example, a case where reports of inventory of fixed assets were transmitted by messages from the three users, X, Y, and Z and accumulated on December 2021. In this case, the possibility that similar messages are transmitted from the same three users on December 2022 is high. That is, if reports are transmitted from the user X and the user Y on December 2022, and the reports are determined to be similar, the workflow ticket management portion 401 searches the database based on the condition that "reports are similar for the user X and the user Y". As the result of the search, the workflow ticket management portion 401 acquires "user Z" as the user name for which transmission is predicted and displays it in the list together with the message "Waiting".

As described above, according to this embodiment, if there exist a plurality of users who transmit the plurality of workflow tickets 420 determined to be similar, the work efficiency of the user on the receiving side can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-143936, filed Sep. 9, 2022, which is hereby incorporated by reference herein in their entirety.

What is claimed is:

1. A non-transitory computer-readable storage medium storing a program executable by a computer of an information processing apparatus to execute a method comprising:
specifying, among messages received by a message exchange service between users, a message to which a workflow ticket for executing a job is attached, wherein the workflow ticket includes:
workflow information portion including information concerning a workflow for the job, status information of the job, and a creator's name of the workflow ticket; and
document information portion including information of a document, including a document name, associated with the job;
acquiring workflow information of a first workflow ticket, among a plurality of existing workflow tickets, from the workflow information portion and the document information portion thereof;
determining whether a second workflow ticket, among the plurality of existing workflow tickets, is similar to the first workflow ticket based on the document information portion thereof; and
displaying, in the message exchange service, a list of the plurality of existing workflow tickets, and the respective workflow information, wherein in a state where the determining determines that the first and second workflow tickets are similar:
displaying the list with the first and second workflow tickets into a group, with a single execution button for receiving a user instruction for executing the jobs associated with the first and second workflow tickets.

2. The medium according to claim 1, wherein the list includes the status information of each job associated with the listed workflow tickets and that has been instructed to be executed.

3. The medium according to claim 1, wherein the displaying lists the first and second workflow tickets determined to be similar adjacent to each other.

4. The medium according to claim 1, wherein:
the determining further predicts whether the first and second workflow tickets are similar based on the workflow information portion thereof, and
the displaying displays the common execution button in a state where the determining predicts that the first and second workflow tickets are also similar based on the workflow information portion.

5. The medium according to claim 4, wherein the displaying includes a message indicating to wait execution of the job associated with the first workflow ticket in the state where the determining predicts that the first and second workflow tickets are similar based on the workflow information portion thereof.

6. The medium according to claim 1, wherein the method further comprises creating a workflow ticket.

7. The medium according to claim 1, wherein the program is a plug-in program incorporated in a program that implements the message exchange service.

8. The medium according to claim 1, wherein the single execution button is disposed adjacent to the listing of the first and second workflow tickets.

9. An information processing apparatus comprising:
at least one memory storing instructions; and
at least one processor that executes the instructions to:
specify, among messages received by a message exchange service between users, a message to which a workflow ticket for executing a job is attached, wherein the workflow ticket includes:
workflow information portion including information concerning a workflow for the job, status information of the job, and a creator's name of the workflow ticket; and
document information portion including information of a document, including a document name, associated with the job;

acquire workflow information of a first workflow ticket, among a plurality of existing workflow tickets, from the workflow information portion and the document information portion thereof;

determine whether a second workflow ticket, among the plurality of existing workflow tickets, is similar to the first workflow ticket based on the document information portion thereof; and display, in the message exchange service, a list of the plurality of existing workflow tickets, and the respective workflow information, wherein in a state where the determining determines that the first and second workflow tickets are similar:

displaying the list with the first and second workflow tickets into a group, with a single execution button for receiving a user instruction for executing the jobs associated with the first and second workflow tickets.

10. The information processing apparatus according to claim 9, wherein the single execution button is disposed adjacent to the listing of the first and second workflow tickets.

11. A method executed in an information processing apparatus, comprising:

specifying, among messages received by a message exchange service between users, a message to which a workflow ticket for executing a job is attached, wherein the workflow ticket includes:

workflow information portion including information concerning a workflow for the job, status information of the job, and a creator's name of the workflow ticket; and document information portion including information of a document, including a document name, associated with the job;

acquiring workflow information of a first workflow ticket, among a plurality of existing workflow tickets, from the workflow information portion and the document information portion thereof;

determining whether a second workflow ticket, among the plurality of existing workflow tickets, is similar to the first workflow ticket based on the document information portion thereof; and displaying, in the message exchange service, a list of the plurality of existing workflow tickets, and the respective workflow information, wherein in a state where the determining determines that the first and second workflow tickets are similar:

displaying the list with the first and second workflow tickets into a group, with a single execution button for receiving a user instruction for executing the jobs associated with the first and second workflow tickets.

12. The method according to claim 11, wherein the single execution button is disposed adjacent to the listing of the first and second workflow tickets.

* * * * *